(12) United States Patent
Suzuki

(10) Patent No.: US 10,914,601 B2
(45) Date of Patent: Feb. 9, 2021

(54) INFORMATION PROCESSING APPARATUS, INFORMATION PROVIDING SYSTEM, INFORMATION PROVIDING METHOD, AND COMPUTER-READABLE STORAGE MEDIUM STORING PROGRAM

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/139,475

(22) Filed: Sep. 24, 2018

(65) Prior Publication Data

US 2019/0128687 A1 May 2, 2019

(30) Foreign Application Priority Data

Oct. 26, 2017 (JP) ................................. 2017-207249

(51) Int. Cl.
*G01C 21/34* (2006.01)

(52) U.S. Cl.
CPC ..... *G01C 21/3461* (2013.01); *G01C 21/3492* (2013.01)

(58) Field of Classification Search
CPC .................. G01C 21/3461; G01C 21/3492

USPC .......................................................... 701/410
See application file for complete search history.

(56) References Cited

U.S. PATENT DOCUMENTS

| 2004/0068366 A1* | 4/2004 | Nisiyama | ........... G01C 21/3461 701/25 |
| 2008/0242258 A1* | 10/2008 | Lim | ................... H04N 21/4345 455/344 |

FOREIGN PATENT DOCUMENTS

| JP | 2004-125726 A | 4/2004 |
| JP | 2005017052 A | 1/2005 |
| JP | 2007205946 A | 8/2007 |
| JP | 2014059221 A | 4/2014 |
| JP | 2014125448 A | 7/2014 |

\* cited by examiner

*Primary Examiner* — Muhammad Shafi

(74) *Attorney, Agent, or Firm* — Hunton Andrews Kurth LLP

(57) ABSTRACT

An information processing apparatus provides information indicating a traveling route according to a designated search type. The information processing apparatus includes a reception unit configured to receive a search request of the traveling route including the search type, a generation unit configured to generate a link cost corresponding to the search type using a traffic information database including information of a road related to the search type, and a search unit configured to search for the traveling route using the link cost corresponding to the search type generated by the generation unit.

7 Claims, 8 Drawing Sheets

FIG. 5A

| LINK NUMBER | SEARCH TYPE-SPECIFIC TRAFFIC COST | | |
|---|---|---|---|
| | EASINESS OF DRIVING | NUMBER OF TRAFFIC SIGNALS | ... |
| ... | ... | ... | ... |
| L1001 | 9 | 2 | ... |
| L1002 | 7 | 4 | ... |
| L1012 | 10 | 1 | ... |
| ... | ... | ... | ... |

| PRIORITY | ROAD LINK HARD TO DRIVE | TRAFFIC COST |
|---|---|---|
| 1 | ROAD LINK WHERE VEHICLE PASSES ONCOMING VEHICLE WITH ROAD WIDTH BARELY ENOUGH TO PASS ONCOMING VEHICLE | 10 |
| 2 | ROAD LINK WHERE LANE CHANGE IS NEEDED WITHIN SHORT DISTANCE | 9 |
| 3 | ROAD LINK WITH NO SIDEWALK AND MANY PEDESTRIANS, SUCH AS SCHOOL ROUTE | 8 |
| 4 | ROAD LINK FOR JOINING MAIN LANE OF EXPRESSWAY OR MOTORWAY WITH HEAVY TRAFFIC | 7 |
| 5 | ROAD LINK FOR LANE CHANGE ON ROAD WITH HEAVY TRAFFIC | 6 |
| 6 | ROAD LINK FOR JOINING WIDE ROAD HAVING TWO OR MORE LANES FROM PARKING LOT THROUGH RIGHT TURN | 5 |
| 7 | ROAD LINK FOR ENTERING PARKING LOT FROM WIDE ROAD HAVING TWO OR MORE LANES THROUGH RIGHT TURN | 4 |
| 8 | ROAD LINK WHERE NUMBER OF LANES IS REDUCED DUE TO ACCIDENT OR CONSTRUCTION | 3 |
| 9 | ROAD LINK FOR CONNECTION TO INTERSECTION HARD TO DETERMINE PRIORITY RELATIONSHIP WITH CROSSROAD | 2 |
| 10 | ROAD LINK FOR RIGHT TURN TO WIDE LOAD HAVING TWO OR MORE LANES AT INTERSECTION WITH NO SIGNAL | 1 |
| ... | ... | ... |

| No. | NUMBER OF TRAFFIC SIGNALS | TRAFFIC COST |
|---|---|---|
| 1 | 0 | 0 |
| 2 | 1 | 1 |
| 3 | 2 | 2 |
| 4 | 3 | 4 |
| 5 | 4 OR MORE | 7 |
| ... | ... | ... |

| LINK NUMBER | TIME COST | ... |
|---|---|---|
| ... | ... | ... |
| L1001 | 5 | ... |
| L1002 | 10 | ... |
| L1011 | 15 | ... |
| ... | ... | ... |

| No. | AVERAGE TRANSIT TIME | TIME COST |
|---|---|---|
| 1 | EQUAL TO OR MORE THAN 10 MINUTES | 20 |
| 2 | EQUAL TO OR MORE THAN 5 MINUTES AND LESS THAN 10 MINUTES | 10 |
| 3 | EQUAL TO OR MORE THAN 3 MINUTES AND LESS THAN 5 MINUTES | 5 |
| 4 | EQUAL TO OR MORE THAN 2 MINUTES AND LESS THAN 3 MINUTES | 3 |
| 5 | EQUAL TO OR MORE THAN 1 MINUTE AND LESS THAN 2 MINUTES | 2 |
| 6 | LESS THAN 1 MINUTE | 1 |
| ... | ... | ... |

602

INFORMATION PROCESSING APPARATUS, INFORMATION PROVIDING SYSTEM, INFORMATION PROVIDING METHOD, AND COMPUTER-READABLE STORAGE MEDIUM STORING PROGRAM

INCORPORATION BY REFERENCE

The disclosure of Japanese Patent Application No. 2017-207249 filed on Oct. 26, 2017 including the specification, drawings and abstract is incorporated herein by reference in its entirety.

BACKGROUND

1. Technical Field

The present disclosure relates to an information processing apparatus, an information providing system, an information providing method, and a computer-readable storage medium storing a program.

2. Description of Related Art

An information processing apparatus that searches for an appropriate route from a departure place to a destination based on a link cost of a road and provides information indicating the searched route becomes widespread.

For example, a car navigation device that, at the time of search of a traveling route, in a case where "autonomous traveling route" is selected by a switch or the like, selects an autonomous traveling route for autonomous traveling using an autonomous traveling device with priority and searches for a traveling route is known (for example, see Japanese Unexamined Patent Application Publication No. 2004-125726 (JP 2004-125726 A)).

SUMMARY

There is demand for providing a driver having a poor awareness of driving, such as a driver having little driving experience or a driver having a less driving frequency with an appropriate traveling route according to, for example, a search type relating to easiness of driving, such as "a route easy to drive" or "a route with less traffic signals".

However, in the related art, a link cost for use in searching a traveling route is determined by, for example, a transit time of a link, an average traveling speed, or the like. Accordingly, it is difficult to provide information indicating an appropriate traveling route according to, for example, a service type or the like relating to easiness of driving.

The disclosure provides an information providing system that provides information indicating an appropriate traveling route according to, for example, a search type relating to easiness of driving, such as a route easy to drive or a route with less traffic signals.

A first aspect of the disclosure relates to an information processing apparatus that provides information indicating a traveling route according to a designated search type. The information processing apparatus includes a reception unit, a generation unit, and a search unit. The reception unit is configured to receive a search request of the traveling route including the search type. The generation unit is configured to generate a link cost corresponding to the search type using a traffic information database including information of a road related to the search type. The search unit is configured to search for the traveling route using the link cost corresponding to the search type generated by the generation unit.

According to the first aspect of the disclosure, since the traveling route is searched using the link cost according to the designated search type, it is possible to provide information indicating an appropriate traveling route according to, for example, the designated search type, such as a route easy to drive or a route with less traffic signals.

The information processing apparatus according to the first aspect of the disclosure may further include a change unit configured to, in a case where a needed time of the traveling route searched by the search unit does not fall within a predetermined reference with respect to a needed time of a reference route as a route searched with a link cost used in a case where the search type is not included in the search request, change the link cost corresponding to the search type.

According to the first aspect of the disclosure, the information processing apparatus can reduce a transit frequency of a road where a driver feels a sense of difficulty to driving, search a traveling route such that an arrival time at a destination is not delayed with respect to a reference route for a predetermined reference or more, and provide a user with the traveling route.

In the information processing apparatus according to the first aspect of the disclosure, the search request may include the search type relating to easiness of driving of a vehicle traveling on the traveling route. The traffic information database may include a traffic cost relating to a degree of difficulty of driving of each road link or information for determining the traffic cost.

According to the first aspect of the disclosure, the information processing apparatus can provide information indicating an appropriate traveling route in response to the search request including the search type relating to the route easy to drive.

In the information processing apparatus according to the first aspect of the disclosure, the search request may include the search type focused on smallness of the number of traffic signals in the traveling route. The traffic information database may include a traffic cost according to the number of traffic signals in each road link or information indicating the number of traffic signals.

According to the first aspect of the disclosure, the information processing apparatus can provide information indicating an appropriate traveling route in response to the search request including the search type focused on smallness of the number of traffic signals.

In the information processing apparatus according to the first aspect of the disclosure, the generation unit may be configured to determine the traffic cost of each road link using the traffic information database, and generate a link cost corresponding to the search type of each road link by weighting and averaging the determined traffic cost and the link cost used in a case where the search type is not included in the search request.

According to the first aspect of the disclosure, the information processing apparatus can generate the link cost of each road link according to the search type included in the search request.

In the information processing apparatus according to the first aspect of the disclosure, the change unit may be configured to change a weight of the traffic cost or a weight of the link cost used in a case where the search type is not included in the search request such that the needed time of the traveling route searched by the search unit falls within the predetermined reference with respect to the needed time of the reference route.

According to the first aspect of the disclosure, the information processing apparatus can change such that the needed time of the traveling route searched by the search unit falls within the predetermined reference with respect to the needed time of the reference route.

In the information processing apparatus according to the first aspect of the disclosure, the change unit may be configured to invalidate a traffic cost with low priority among traffic costs included in the traveling route such that the needed time of the traveling route searched by the search unit falls within the predetermined reference with respect to the needed time of the reference route.

According to the first aspect of the disclosure, the information processing apparatus can easily change the needed time of the traveling route searched by the search unit falls within the predetermined reference with respect to the needed time of the reference route.

A second aspect of the disclosure relates to an information providing system that provides information indicating a traveling route according to a designated search type. The information providing system includes a reception unit, a generation unit, and a search unit. The reception unit is configured to receive a search request of the traveling route including the search type. The generation unit is configured to generate a link cost corresponding to the search type using a traffic information database including information of a road related to the search type. The search unit is configured to search for the traveling route using the link cost corresponding to the search type generated by the generation unit.

A third aspect of the disclosure relates to an information providing method that provides information indicating a traveling route according to a predetermined search type. The information providing method includes, with a computer, receiving a search request of the traveling route including the search type, generating a link cost corresponding to the search type using a traffic information database including information of a road related to the search type, and searching for the traveling route using the link cost corresponding to the search type generated in the generating.

A fourth aspect of the disclosure relates to a computer-readable storage medium storing a program. The program causes a computer to execute the information providing method according to the third aspect of the disclosure.

According to the aspects of the disclosure, it is possible to enable an information providing system to provide information indicating an appropriate traveling route according to, for example, a search type relating to easiness of driving, such as a route easy to drive or a route with less traffic signals.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a table showing a traffic information DB according to the embodiment;

FIG. 5B is a table showing the traffic information DB according to the embodiment;

FIG. 5C is a table showing the traffic information DB according to the embodiment;

FIG. 6A is a table showing a trip time DB according to the embodiment;

FIG. 6B is a table showing the trip time DB according to the embodiment;

DETAILED DESCRIPTION OF EMBODIMENTS

Figure 1:
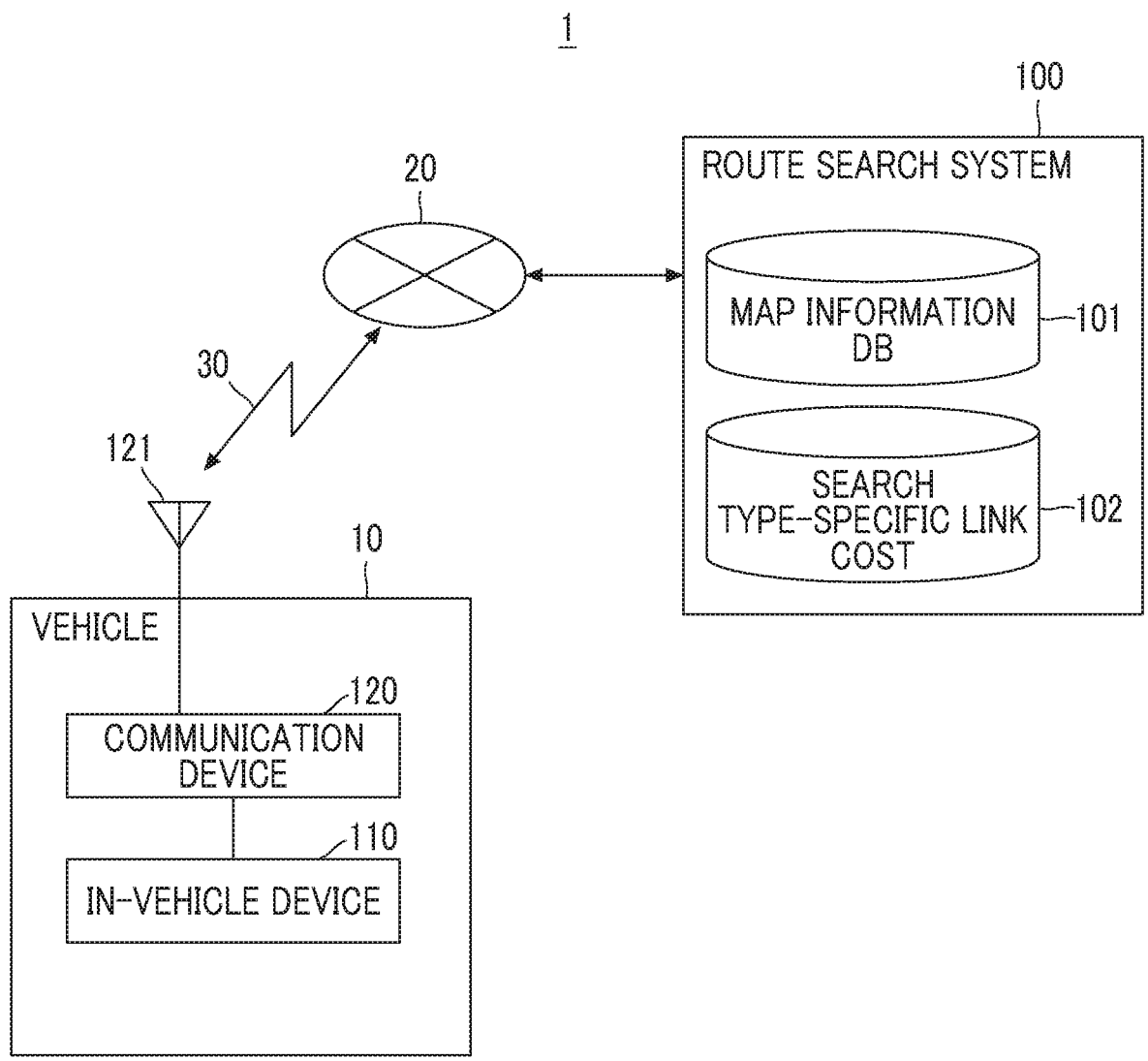
FIG. 1 is a diagram showing an example of the system configuration of an information providing system according to an embodiment.

Hereinafter, a mode for carrying out the disclosure will be described referring to the drawings.

System Configuration

FIG. 1 is a diagram showing an example of the system configuration of an information providing system according to an embodiment. An information providing system 1 is a system that provides an occupant or the like of a vehicle 10 with information indicating an appropriate traveling route according to a search type relating to easiness of driving, such as "a route easy to drive" or "a route with less traffic signals", designated by the occupant or the like of the vehicle 10, such as an automobile. Map information indicating the traveling route or route information for use in displaying the map information indicating the traveling route is an example of information indicating an appropriate traveling route.

The information providing system 1 includes, for example, a route search system 100 that is connected to a communication network 20, and an in-vehicle device 110 that is connected to the communication network 20 using a communication device 120 and is able to perform communication with the route search system 100. Here, the communication device 120 is a device that performs wireless communication using an antenna 121 mounted in the vehicle 10, the communication device 120, or the like and is provided for connection to the communication network 20, and is realized by, for example, a data communication module (DCM) or the like.

The in-vehicle device 110 is, for example, an information processing apparatus, such as a car navigation device, or an information processing apparatus, such as an in-vehicle electronic control unit (ECU), that is mounted in the vehicle. The in-vehicle device 110 receives an input operation of a destination, a selection operation of a search type, and the like from the occupant of the vehicle 10, and transmits a search request including a current location of the vehicle 10, the received destination, the received search type, and the like to the route search system 100 through the communication device 120.

The in-vehicle device 110 receives information indicating the traveling route transmitted from the route search system 100 through the communication device 120 and makes a display device in the in-vehicle device 110 or the vehicle 10 display the map information indicating the traveling route, and the like based on the received information.

The route search system (information processing apparatus) 100 is, for example, a system including an information processing apparatus, such as a personal computer (PC), or a plurality of information processing apparatuses. The route search system 100 receives the search request including the search type from the in-vehicle device 110 and searches for the requested traveling route using a map information database (DB) 101 that is road information and a search type-specific link cost 102 that is a link cost different for each search type.

Figure 2:
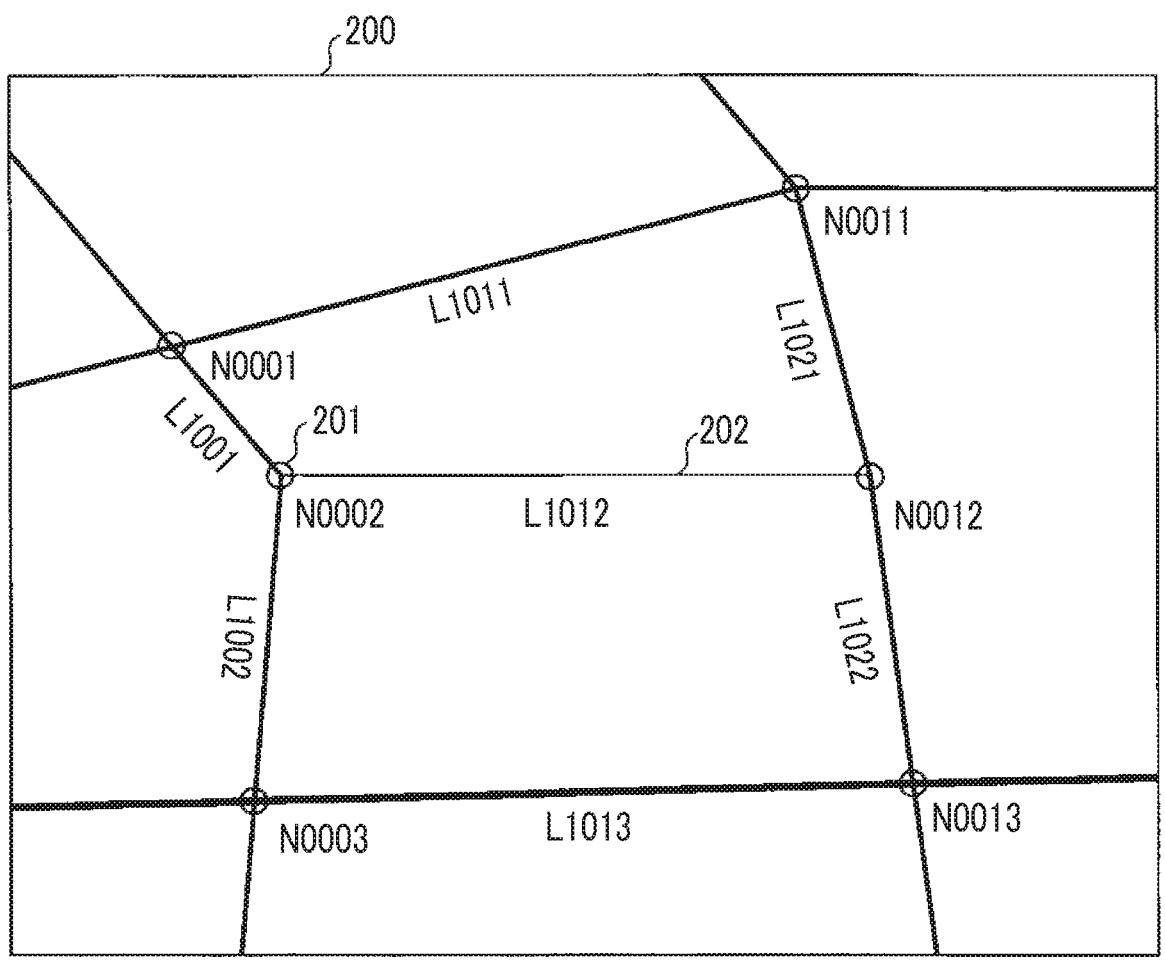
FIG. 2 is a diagram showing an image of an example of map information according to the embodiment.

FIG. 2 is a diagram showing an image of an example of the map information according to the embodiment. In the map information DB 101, for example, as illustrated in FIG. 2, digital road map 200 including information of a node 201 where a plurality of roads crosses, joins, and branches off and information of a link 202 that is a road connecting the nodes 201 is stored. In the following description, the link 202 may be referred to as a "road link".

In information of the node 201, for example, a node number for identifying the node 201, node coordinates indicating a position of the node 201, a link number of the link 202 connected to the node 201, and the like are included. In information of the link 202, for example, information of a link number for identifying the link 202, coordinates of a start point and an end point of the link 202, a road type, and the like is included.

In a car navigation device or the like of the related art, the shortest route having a minimum cost between a first node to be a departure point and a second node to be a destination point using a time cost as a prescribed link cost common to a plurality of search types is searched using a known Dijkstra's algorithm or the like.

However, in the time cost, information of a road where a driver having a poor awareness of driving, such as a driver having little driving experience or a driver having a less driving frequency, feels a sense of easiness of driving (or difficulty of driving) is not included. Accordingly, in the related art, for example, it is difficult to provide information indicating an appropriate traveling route according to, for example, a search type relating to easiness of driving, such as "a route easy to drive" or "a route with less traffic signals".

Accordingly, the route search system 100 according to the embodiment generates the search type-specific link cost 102 that is a link cost according to a search type, such as "a route easy to drive" or "a route with less traffic signals", and searches for the traveling route using the generated link cost.

For example, in a case where the search request of the traveling route including the search type is received from the in-vehicle device 110, the route search system 100 generates the link cost corresponding to the search type using a traffic information database (DB) including information of a road related to the search type included in the search request. For example, the route search system 100 determines a traffic cost as a cost relating to a degree of difficulty of traffic of a road link using information of the road related to the search type included in the traffic information DB.

The route search system 100 generates the link cost of each road link corresponding to the search type by weighting and averaging the determined traffic cost and the above-described time cost and searches for the traveling route using the generated link cost. Here, in the link cost to be generated, the traffic cost as the cost relating to the degree of difficulty of traffic of the road link is reflected. Accordingly, the route search system 100 is enabled to provide information indicating an appropriate traveling route according to, for example, a search type relating to easiness of driving, such as "a route easy to drive" or "a route with less traffic signals".

Preferably, the route search system 100 changes the link cost corresponding to the search type in a case where a needed time in the searched traveling route does not fall within a predetermined reference (for example, within 150% or the like) for a needed time of a reference route as a route searched with a prescribed link cost used in a case where the search type is not included in the search request. For example, the route search system 100 changes a weight of the traffic cost or a weight of the time cost such that the needed time in the searched traveling route falls within the predetermined reference with respect to the needed time of the reference route.

With this, the route search system 100 is enabled to reduce a transit frequency of a road where the driver feels a sense of difficulty of driving, search a traveling route such that an arrival time at a destination is not delayed with respect to the reference route for the predetermined reference or more, and provide a user with the traveling route.

"A route easy to drive" or "a route with less traffic signals" is an example of the search type relating to easiness of driving. In the search type relating to easiness of driving, for example, various search types, such as "a road with a wide road width", "a road with less pedestrians", and "a road with little traffic", are included.

Hardware Configuration

Hardware Configuration of In-Vehicle Device and Route Search System

The route search system 100 is constituted of an information processing apparatus having the configuration of a general computer or a plurality of information processing apparatuses. The in-vehicle device 110 also has the configuration of a general computer. Accordingly, here, the hardware configuration of a general computer will be described.

Figure 3:
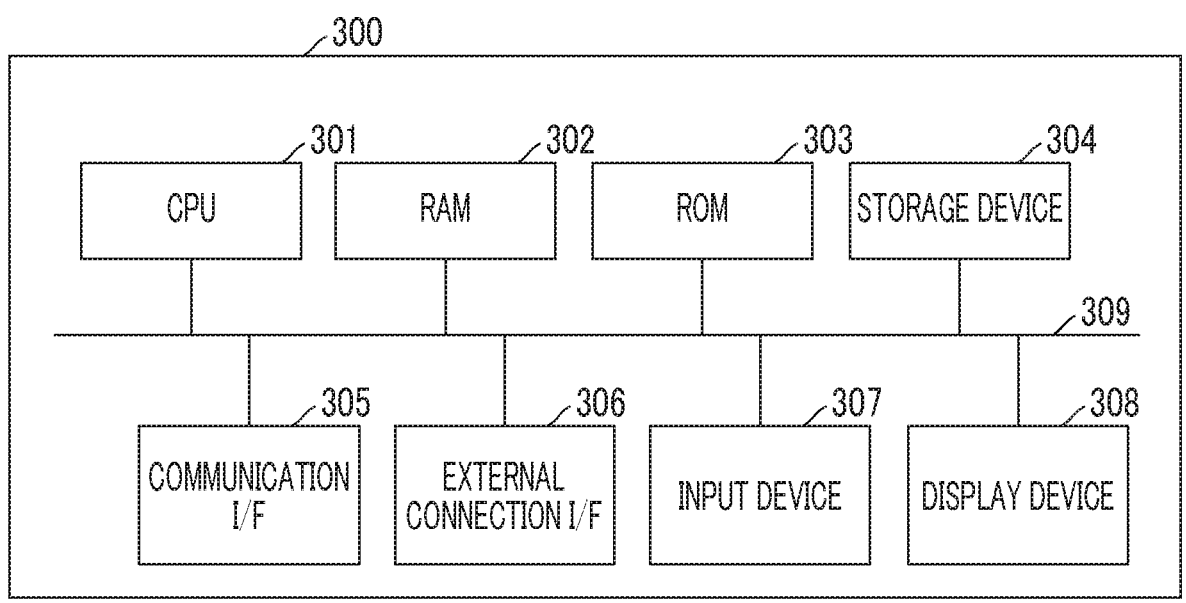
FIG. 3 is a diagram showing an example of the hardware configuration of a computer according to the embodiment.

FIG. 3 is a diagram showing an example of the hardware configuration of a computer according to the embodiment. A computer 300 includes, for example, a central processing unit (CPU) 301, a random access memory (RAM) 302, a read only memory (ROM) 303, a storage device 304, a communication interface (I/F) 305, an external connection I/F 306, an input device 307, a display device 308, a system bus 309, and the like.

The CPU 301 is an arithmetic device that realizes each function of the computer 300 by reading a program, data, and the like stored in the ROM 303, the storage device 304, or the like on the RAM 302 and executing processing. The RAM 302 is a volatile memory that is used as a work area or the like of the CPU 301. The ROM 303 is a nonvolatile memory that retains the program or data even through power is turned off. The storage device 304 is a storage device, such as a hard disk drive (HDD) or a solid state drive (SSD), and stores, for example, an operating system (OS), programs, various pieces of data, and the like.

The communication I/F 305 is an interface that is used when the computer 300 performs communication with other information processing apparatuses or the like. For example, in a case where the computer 300 is the route search system 100 or is included in the route search system 100, the communication I/F 305 is a network interface, such as a wired or wireless local area network (LAN). In a case where the computer 300 is the in-vehicle device 110, the communication I/F 305 is, for example, a communication interface, such as a controller area network (CAN), that is used for communication with the ECU, the communication device 120, or the like mounted in the vehicle 10.

The external connection I/F 306 is an interface that is used for connection of external equipment to the computer 300. The external equipment includes, for example, a recording medium or the like. In a case where the computer 300 is the in-vehicle device 110, the external equipment may include the communication device 120 or the like.

The input device 307 is an input device, such as a keyboard, a touch panel, or an operation button, that receives an input operation of a user. The display device 308 is a display device that displays a processing result of the computer 300, and the like. The system bus 309 is connected in common to the above-described constituent elements, and transfers, for example, an address signal, a data signal, various control signals, and the like.

Functional Configuration

Figure 4:
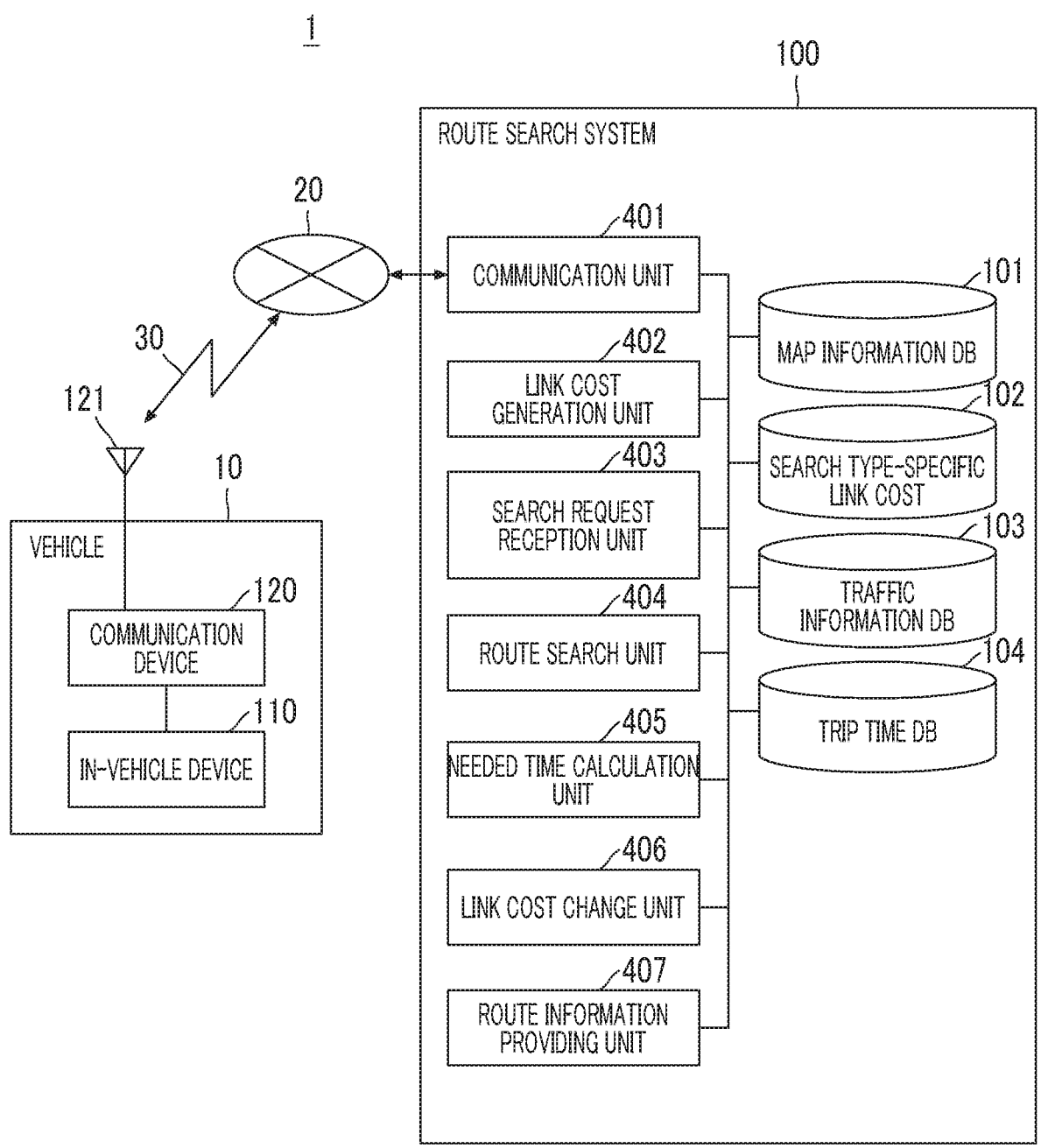
FIG. 4 is a diagram showing an example of the functional configuration of an information providing system according to the embodiment.

The functional configuration of the information providing system 1 according to the embodiment will be described. FIG. 4 is a diagram showing an example of the functional configuration of the information providing system according to the embodiment.

Functional Configuration of Route Search System

The route search system 100 has, for example, a communication unit 401, a link cost generation unit 402, a search request reception unit 403, a route search unit 404, a needed time calculation unit 405, a link cost change unit 406, a route information providing unit 407, a map information DB 101, a search type-specific link cost 102, a traffic information DB 103, a trip time DB 104, and the like.

The route search system 100 realizes the above-described functional configuration by the CPU 301 of FIG. 3 executing a predetermined program stored in a non-transitory computer-readable storage medium, such as the ROM 303 or the storage device 304. Alternatively, the route search system 100 may realize the above-described functional configuration by a plurality of computers 300 executing a predetermined program.

At least a part of the above-described functional configuration may be realized by hardware. The map information DB 101, the traffic information DB 103, the trip time DB 104, and the like may be constituted using an external database.

The communication unit 401 is realized by, for example, the program that is executed on the CPU 301, and the like, and connects the route search system 100 to the communication network 20 using the communication I/F 305 to perform communication with the in-vehicle device 110.

The link cost generation unit (generation unit) 402 is realized by, for example, the program that is executed on the CPU 301, and the like, and generates the search type-specific link cost 102 as the link cost corresponding to the search type using the traffic information database (traffic information DB) 103.

For example, the link cost generation unit 402 determines the traffic cost as the cost relating to the degree of difficulty of traffic of each road link using information of the road related to the search type included in the traffic information DB 103. The link cost generation unit 402 weights and averages the determined traffic cost and the time cost as the prescribed link cost used in a case where the search type is not included in the search request using Expression (1) and generates the link cost of each road link.

$$\text{Link Cost} = \frac{\text{Traffic Cost} \times \text{Weight of Traffic Cost} + \text{Time Cost} \times \text{Weight of Time Cost}}{\text{Weight of Traffic Cost} + \text{Weight of Time Cost}} \quad (1)$$

Here, the traffic cost is a cost relating to easiness of driving or difficulty of driving (the degree of difficulty of driving) corresponding to one or more search types relating to easiness of driving. For example, the traffic cost is set to be higher in a road link harder to drive. The link cost generation unit 402 can acquire the traffic cost of each road link or information for determining the traffic cost from the traffic information DB 103.

FIGS. 5A to 5C are a table showing the traffic information DB according to the embodiment. As the simplest example, as shown in FIG. 5A, in the traffic information DB 103, correspondence information 501 having the link number for identifying the road link and the search type-specific traffic cost in correspondence with each other is included.

The example of FIG. 5A shows that, in a case where the search type is "easiness of driving", a traffic cost of a road link having a link number "L1001" is "9", and a traffic cost of a road link having a link number "L1002" is "7". Similarly, it is shown that, in a case where the search type is "number of traffic signals" as a search type focused on the number of traffic signals, a traffic cost of a road link having a link number "L1012" is "1", and the traffic cost of the road link having the link number "L1001" is "2".

Here, the search type "easiness of driving" is an example of the search type relating to easiness of driving. In this case, the traffic cost of each road link can be determined using correspondence information 502 shown in FIG. 5B as an example.

In the correspondence information 502 shown in FIG. 5B, as an example, conditions of road links where a response "want to make a detour" exceeds a response "never mind" in a questionnaire for a driver having a poor awareness of driving are listed in "road link hard to drive". The conditions of the road links of priority 1 to 10 are arranged in a descending order of the number of responses "want to make a detour", and the traffic cost corresponding to each road link is set to be higher when the number of responses "want to make a detour" is larger. That is, in a case where the search type is "easiness of driving", the traffic cost is set to be higher for a road link that a driver having a poor awareness of driving further wants to avoid.

As another example, the traffic cost corresponding to the search type "easiness of driving" may be determined using, for example, the number of traffic signals, the number of lanes, a road width, information of roads, such as one-way traffic, road traffic information acquired from an external information providing service, and the like.

For example, in a case where a road link has a road width less than a predetermined value and is not in one-way traffic, the link cost generation unit 402 can determine to be "road link where vehicle passes oncoming vehicle with road width barely enough to pass oncoming vehicle" of the correspondence information 502, and can determine the traffic cost to "10". Similarly, in a case where a road link has a length less than a predetermined value and the number of lanes is equal to or greater than a predetermined value, the link cost generation unit 402 can determine to be "road link where lane change is needed within short distance" of No. 2 of the correspondence information 502 and can determine the traffic cost to "9".

"Number of traffic signals" as an example of the search type relating to easiness of driving can be determined using the correspondence information 503 shown in FIG. 5C as an example. In the example of FIG. 5C, in correspondence information 503, the number of traffic signals is stored in correspondence with the traffic cost. For example, the link cost generation unit 402 can acquire the number of traffic signals in each road link from the map information DB 101, the external information providing service, or the like, and can determine the traffic cost corresponding to the search type "number of traffic signals" using the correspondence information 503.

Information shown in FIGS. 5A to 5C is just an example. In summary, in the traffic information DB 103, the traffic cost corresponding to one or more search types relating to easiness of traffic of each road link or information for determining the traffic cost may be included.

The time cost of Expression (1) is a prescribed link cost common to one or more search types used in a case where the search type is not included in the search request, and as described above, a link cost generally used in the car navigation device or the like can be applied.

For example, as disclosed in JP 2004-125726 A, the time cost is assigned to each link in advance taking into consideration the length of the link, a road type, an average traveling speed, and the like. For example, the time cost may be included in information of the link 202 of the digital road map 200 shown in FIG. 2.

As another example, the link cost generation unit 402 may determine the time cost using the trip time DB 104 that stores the time cost of each road link or information for determining the time cost.

FIGS. 6A and 6B are a table showing the trip time DB according to the embodiment. As the simplest example, as shown in FIG. 6A, in the trip time DB 104, correspondence information 601 having the link number for identifying the road link in correspondence with the time cost is included. The example of FIG. 6A shows that the time cost of the link number "L1001" is "5", and the time cost of the link number "L1002" is "10".

Each time cost can be determined using correspondence information 602 shown n FIG. 6B as an example. The example of FIG. 6B shows a time cost corresponding to an average transit time indicating a time needed for transit through a road link. Accordingly, in "time cost" of the correspondence information 601 shown in FIG. 6A, information of the "average transit time" or the like may be stored instead of the "time cost". In this case, the link cost generation unit 402 can convert the average transit time to the time cost using the correspondence information 602 shown in FIG. 6B.

Information shown in FIGS. 6A and 6B is just an example for description. In regards to the time cost, while various link costs that are generally used in the car navigation device or the like as described above can be used, here, detailed description will be omitted.

In Expression (1), "weight of traffic cost" is a weight for a traffic cost used in weighted averaging, and "weight of time cost" is a weight for a time cost used in weighted averaging.

With the above-described configuration, the link cost generation unit 402 can generate the search type-specific link cost 102 that is the link cost corresponding to one or more search types relating to easiness of driving.

Here, returning to FIG. 4, description of the functional configuration of the route search system 100 will be continued.

The search request reception unit (reception unit) 403 is realized by, for example, the program that is executed on the CPU 301 of FIG. 3, and the like, and receives a search request of a traveling route transmitted from the in-vehicle device 110 or the like. In the search request, for example, the search type, such as "easiness of driving" or "number of traffic signals", coordinate information of the vehicle 10, coordinate information of a destination, and the like are included.

The route search unit 404 is realized by, for example, the program that is executed on the CPU 301 of FIG. 3, and the like, and searches for the requested traveling route using the link cost corresponding to the search type included in the search request received by the search request reception unit 403.

For example, the route search unit 404 specifies a first node closest to the vehicle 10 and a second node closest to the destination using the digital road map 200 shown in FIG. 2 stored in the map information DB 101. The route search unit 404 searches for a traveling route having a minimum cost among routes from the first node to the second node using the link cost corresponding to the search type generated by the link cost generation unit 402. The traveling route having the minimum cost can be obtained using a known Dijkstra's algorithm or the like as described above.

Preferably, at this time, the route search unit 404 searches for a reference route as a route from the first node to the second node using a prescribed link cost (time cost) used in a case where the search type is not included in the search request.

The needed time calculation unit 405 is realized by, for example, the program that is executed on the CPU 301 of FIG. 3, and the like. The needed time calculation unit 405 calculates a needed time 1 as a needed time needed for traveling along the "traveling route" searched by the route search unit 404 and a needed time 2 as a needed time needed for traveling along the "reference route".

The link cost change unit (change unit) 406 is realized by, for example, the program that is executed on the CPU 301 of FIG. 3, and the like. The link cost change unit 406 compares the needed time 1 and the needed time 2 calculated by the needed time calculation unit 405, and in a case where the comparison result does not fall within a predetermined reference, changes the link cost corresponding to the search type included in the search request. Here, it is assumed that the predetermined reference is determined in advance to be within X % (for example, within 150% or the like) of the needed time (needed time 2) of the reference route such that the needed time (needed time 1) of the traveling route is not excessively extended.

The link cost change unit 406 changes at least one of the weight of the traffic cost and the weight of the time cost of Expression (1), thereby changing the link cost corresponding to the search type included in the search request such that the needed time of the traveling route is shortened.

Preferably, the link cost change unit 406 changes at least one of the weight of the traffic cost and the weight of the time cost of Expression (1) such that the comparison result of the needed time 1 and the needed time 2 falls within the predetermined reference.

Preferably, the link cost change unit 406 invalidates a traffic cost having low priority among the traffic costs of the road links included in the traveling route such that the comparison result of the needed time 1 and the needed time 2 falls within the predetermined reference.

The route search unit 404 repeatedly researches the requested traveling route using the link cost changed by the link cost change unit 406 until the needed time 1 falls within X % of the needed time 2.

The route information providing unit 407 is realized by, for example, the program that is executed on the CPU 301 of FIG. 3, and the like, and transmits (provides) information indicating the traveling route searched through the above-described processing to the in-vehicle device 110 as a request source of the search request through the communication unit 401.

Functional Configuration of In-Vehicle Device

In the information providing system 1 shown in FIG. 4, the in-vehicle device 110 has, for example, functions of a general car navigation device.

The in-vehicle device 110 has a function of receiving an input operation of a destination, a selection operation of a search type, and the like from the occupant of the vehicle 10, and transmitting a search request including the received destination, search type, and the like to the route search system 100 through the communication device 120.

The in-vehicle device 110 has a function of receiving information indicating the traveling route transmitted from the route search system 100 through the communication device 120, and making the display device or the like in the in-vehicle device 110 or the vehicle 10 to display map information or the like indicating the received traveling route.

The functional configuration of the information providing system 1 shown in FIG. 4 is an example, and the information providing system 1 can be realized with various system configurations. For example, at least a part of the functions included in the route search system 100 may be included in the in-vehicle device 110.

Flow of Processing

A flow of processing of an information providing method according to the embodiment will be described.

Route Search Processing

Figure 7:
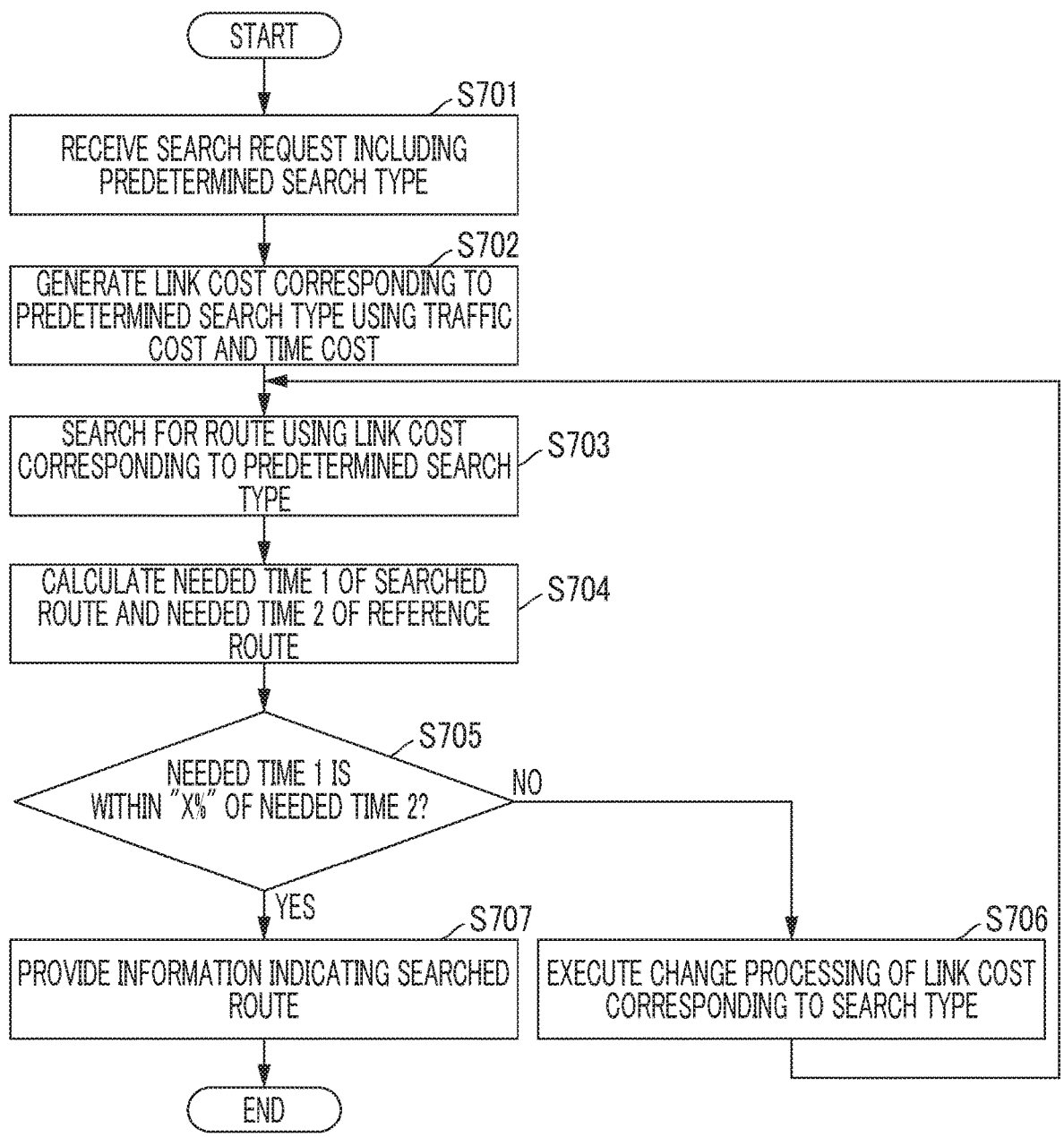
FIG. 7 is a flowchart showing an example of search processing of a route according to the embodiment.

FIG. 7 is a flowchart showing an example of route search processing according to the embodiment. The processing is an example of route search processing that the route search system 100 shown in FIG. 4 executes, for example.

In Step S701, the communication unit 401 of the route search system 100 receives the search request transmitted from the in-vehicle device 110, and the search request reception unit 403 receives the search request received by the communication unit 401. In the search request, for example, the search type (predetermined search type) relating to easiness of driving, such as "easiness of driving" or "number of traffic signals", is included.

In Step S702, the link cost generation unit 402 of the route search system 100 generates the link cost corresponding to the search type included in the search request using the traffic information DB 103. For example, in a case where the search type included in the search request is "easiness of driving", the link cost generation unit 402 acquires the traffic cost of each road link corresponding to "easiness of driving" using the correspondence information 501 shown in FIG. 5A. The link cost generation unit 402 acquires the time cost of each road link using, for example, the trip time DB shown in FIG. 6A. The link cost generation unit 402 generates the link cost of each road link corresponding to the search type included in the search request by weighting and averaging the traffic cost of each road link and the time cost using Expression (1).

In Step S703, the route search unit 404 of the route search system 100 searches for the traveling route using the link cost generated by the link cost generation unit 402. For example, the route search unit 404 searches for the shortest route having the minimum cost between the current position of the vehicle 10 and the destination included in the search request using, for example, a known Dijkstra's algorithm or the like.

In Step S704, the needed time calculation unit 405 of the route search system 100 calculates the needed time 1 of the traveling route searched by the route search unit 404 in Step S703 and the needed time 2 of the reference route searched using the prescribed link cost (time cost).

In Step S705, the link cost change unit 406 of the route search system 100 determines whether or not the needed time 1 is within "X %" of the needed time 2. Here, "X %" is the predetermined reference set such that the needed time 1 of the traveling route is not excessively extended with respect to the needed time 2 of the reference route, and for example, it is assumed that a value, such as 130% or 150%, greater than 100% is set.

In a case where the needed time 1 is not within "X %" of the needed time 2, that is, in a case where the needed time 1 does not fall within the predetermined reference with respect to the needed time 2, the link cost change unit 406 progresses the process to Step S706. In a case where the needed time 1 is within "X %" of the needed time 2, that is, in a case where the needed time 1 falls within the predetermined reference with respect to the needed time 2, the link cost change unit 406 progresses the process to Step S707.

In a case where the process progresses to Step S706, the link cost change unit 406 executes change processing for changing the link cost corresponding to the search type. For example, the link cost change unit 406 executes change processing of the link cost shown in FIG. 8.

Figure 8:
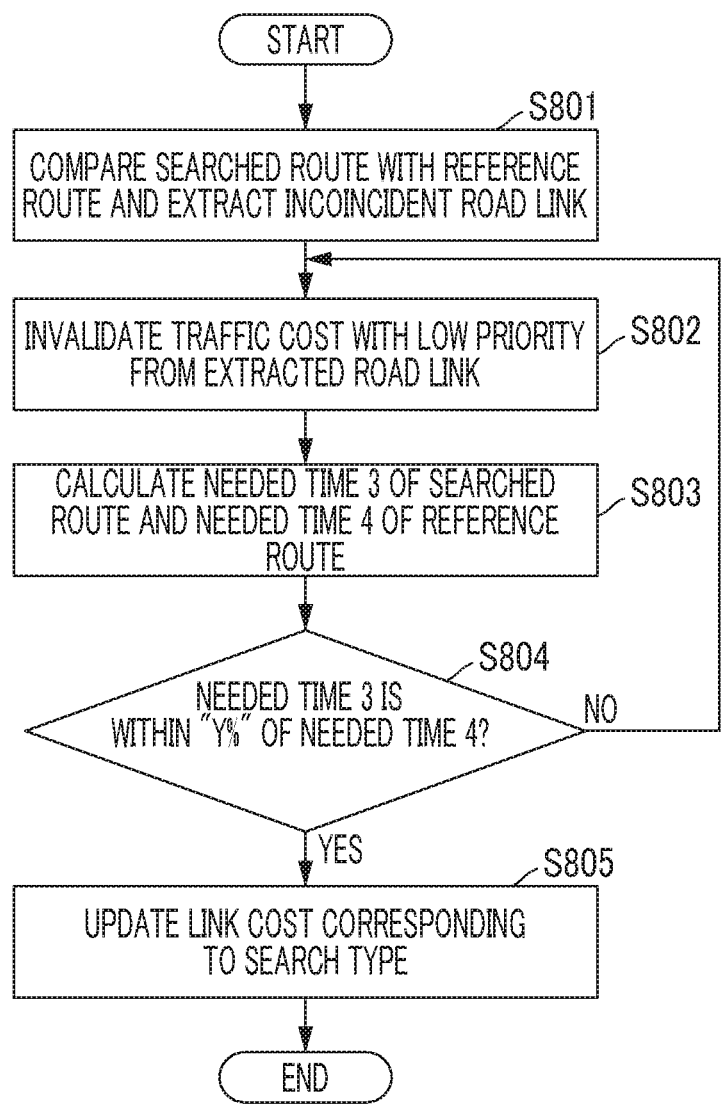
FIG. 8 is a flowchart showing an example of change processing of a link cost according to the embodiment.

FIG. 8 is a flowchart showing change processing of the link cost according to the embodiment. The processing shows an example of the change processing of the link cost that the link cost change unit 406 executes in Step S706 of FIG. 7.

In Step S801, the link cost change unit 406 compares the traveling route searched by the route search unit 404 and the reference route, and extracts all road links that are incoincident between both of the traveling route and the reference route.

In Step S802, the link cost change unit 406 invalidates a traffic cost having low priority in the extracted road links. For example, the link cost of the road link is obtained by weighting and averaging the traffic cost and the time cost as shown in Expression (1). Accordingly, the link cost change unit 406 sets the weight of the traffic cost (or the traffic cost) of the road link to "0", thereby restraining the traffic cost from being reflected in the link cost of the road link, that is, invalidating the traffic cost.

For example, in the correspondence information 502 shown in FIG. 5B, a road link having higher priority has a traffic cost set to be higher, and a road link having lower priority has a traffic cost set to be lower. Accordingly, the link cost change unit 406 sets the weights of one or more traffic costs (for example, traffic cost "1", "2", and the like) of road links having a lower traffic cost among the extracted road links to "0", thereby invalidating a traffic cost of a road link having low priority.

In Step S803, the needed time calculation unit 405 calculates a needed time 3 of the traveling route and a needed time 4 of the reference route using the link cost corresponding to the search type with the traffic cost having low priority deleted in Step S803.

As a preferable example, the needed time calculation unit 405 calculates a needed time of an incoincident road link extracted in Step S801 among the road links included in the traveling route and defines the calculated needed time as the needed time 3, and calculates a needed time of an incoincident road link extracted in Step S801 among the road links included in the reference route and defines the calculated needed time as the needed time 4. With this, since road links that are coincident between both of the traveling route and the reference route can be excluded from a calculation target of a needed time, it is possible to reduce a load of the needed time calculation unit 405 and to accelerate calculation processing of a needed time.

As another example, the needed time calculation unit 405 may calculate the needed time of the traveling route searched by the route search unit 404 and define the calculated needed time as the needed time 3, and may calculate the needed time of the reference route and define the calculated needed time as the needed time 4.

In Step S804, the link cost change unit 406 determines whether or not the needed time 3 is within "Y %" of the needed time 4. Here, "Y %" is a desired value set in advance such that the needed time 3 of the traveling route falls within "Y %" of the needed time 4 of the reference route.

In another example above described where the needed time of the traveling route is defined as the needed time 3, and the needed time of the reference route is defined as the needed time 4, "Y %" and "X %" may the same value.

In a case where the needed time 3 is not within "Y %" of the needed time 4, that is, in a case where the needed time 3 does not fall within the desired value with respect to the needed time 4, the link cost change unit 406 returns the process to Step S802, and repeatedly executes the same processing. In a case where the needed time 3 is within "Y %" of the needed time 4, that is, in a case where the needed time 3 falls within the desired value with respect to the needed time 4, the link cost change unit 406 progresses the process to Step S805.

In a case where the process progresses to Step S805, the link cost change unit 406 updates the link cost corresponding to the search type and progresses the process from Step S706 of FIG. 7 to Step S703.

Here, returning to FIG. 7, description of the flowchart of the route search processing will be continued.

In a case where the process progresses from Step S706 to Step S703, the route search system 100 executes Steps S703 to S705 again using the link cost corresponding to the search type changed in Step S706.

In a case where the process progresses from Step S705 to Step S707, the route information providing unit 407 of the route search system 100 transmits (provides) information indicating the searched traveling route to the in-vehicle device 110 as the request source of the search request.

With the above-described processing, the information providing system 1 is enable to provide information indicating an appropriate traveling route according to, for example, the search type relating to easiness of driving, such as a route easy to drive or a route with less traffic signals.

The change processing of the link cost shown in FIG. 8 is an example. As long as the link cost change unit 406 changes the weight of the traffic cost or the weight of the prescribed link cost such that the needed time 1 of the traveling route falls within the predetermined reference with respect to the needed time 2 of the reference route, a method of the change processing of the link cost may be an optional method.

APPLICATION EXAMPLE

Although the embodiment of the disclosure has been described above, the disclosure is not limited to the above-described embodiment, and various modifications or alterations may be made without departing from the spirit and scope of the disclosure described in the claims.

For example, in the above-described embodiment, a case where the request source that transmits the search request including the search type is the in-vehicle device 110 has been described. However, the disclosure is not limited thereto, the request source that transmits the search request including the search type may be, for example, an information terminal, such as a smartphone or a tablet terminal, which is carried with the occupant or the like of the vehicle 10.

What is claimed is:

1. An information processing apparatus that provides information indicating a traveling route according to a designated search type, the information processing apparatus comprising:
   a reception unit configured to receive a search request of the traveling route including the search type;
   a generation unit configured to generate a link cost corresponding to the search type using a traffic information database including information of a road related to the search type;
   a search unit configured to search for the traveling route using the link cost corresponding to the search type generated by the generation unit; and
   a change unit configured to, in a case where a needed time of the traveling route searched by the search unit does not fall within a predetermined reference with respect to a needed time of a reference route as a route searched with a link cost used in a case where the search type is not included in the search request, change the link cost corresponding to the search type,
   wherein:
      the search request includes the search type relating to easiness of driving of a vehicle traveling on the traveling route;
      the traffic information database includes a traffic cost relating to a degree of difficulty of driving of each road link or information for determining the traffic cost; and
      the change unit is configured to invalidate a traffic cost with low priority among traffic costs included in the traveling route such that the needed time of the traveling route searched by the search unit falls within the predetermined reference with respect to the needed time of the reference route.

2. The information processing apparatus according to claim 1, wherein:
   the search request includes the search type focused on smallness of the number of traffic signals in the traveling route; and
   the traffic information database includes a traffic cost according to the number of traffic signals in each road link or information indicating the number of traffic signals.

3. The information processing apparatus according to claim 1, wherein the generation unit is configured to:
   determine the traffic cost of each road link using the traffic information database; and
   generate a link cost corresponding to the search type of each road link by weighting and averaging the determined traffic cost and the link cost used in a case where the search type is not included in the search request.

4. The information processing apparatus according to claim 3, wherein the change unit is configured to change a weight of the traffic cost or a weight of the link cost used in a case where the search type is not included in the search request such that the needed time of the traveling route searched by the search unit falls within the predetermined reference with respect to the needed time of the reference route.

5. An information providing system that provides information indicating a traveling route according to a designated search type, the information providing system comprising:
- a reception unit configured to receive a search request of the traveling route including the search type;
- a generation unit configured to generate a link cost corresponding to the search type using a traffic information database including information of a road related to the search type;
- a search unit configured to search for the traveling route using the link cost corresponding to the search type generated by the generation unit; and
- a change unit configured to, in a case where a needed time of the traveling route searched by the search unit does not fall within a predetermined reference with respect to a needed time of a reference route as a route searched with a link cost used in a case where the search type is not included in the search request, change the link cost corresponding to the search type, wherein:
- the search request includes the search type relating to easiness of driving of a vehicle traveling on the traveling route;
- the traffic information database includes a traffic cost relating to a degree of difficulty of driving of each road link or information for determining the traffic cost; and
- the change unit is configured to invalidate a traffic cost with low priority among traffic costs included in the traveling route such that the needed time of the traveling route searched by the search unit falls within the predetermined reference with respect to the needed time of the reference route.

6. An information providing method that provides information indicating a traveling route according to a predetermined search type, the information providing method comprising:
- with a computer,
- receiving a search request of the traveling route including the search type;
- generating a link cost corresponding to the search type using a traffic information database including information of a road related to the search type;
- searching for the traveling route using the link cost corresponding to the search type generated in the generating; and
- changing, in a case where a needed time of the traveling route searched by the search unit does not fall within a predetermined reference with respect to a needed time of a reference route as a route searched with a link cost used in a case where the search type is not included in the search request, the link cost corresponding to the search type, wherein:
- the search request includes the search type relating to easiness of driving of a vehicle traveling on the traveling route;
- the traffic information database includes a traffic cost relating to a degree of difficulty of driving of each road link or information for determining the traffic cost; and
- the method further comprises invalidating a traffic cost with low priority among traffic costs included in the traveling route such that the needed time of the traveling route searched by the search unit falls within the predetermined reference with respect to the needed time of the reference route.

7. A non-transitory computer-readable storage medium storing a program causing a computer to execute an information providing method, the information providing method comprising:
- receiving a search request of the traveling route including the search type;
- generating a link cost corresponding to the search type using a traffic information database including information of a road related to the search type; and
- searching for the traveling route using the link cost corresponding to the search type generated in the generating; and
- changing, in a case where a needed time of the traveling route searched by the search unit does not fall within a predetermined reference with respect to a needed time of a reference route as a route searched with a link cost used in a case where the search type is not included in the search request, the link cost corresponding to the search type, wherein:
- the search request includes the search type relating to easiness of driving of a vehicle traveling on the traveling route;
- the traffic information database includes a traffic cost relating to a degree of difficulty of driving of each road link or information for determining the traffic cost; and
- the method further comprises invalidating a traffic cost with low priority among traffic costs included in the traveling route such that the needed time of the traveling route searched by the search unit falls within the predetermined reference with respect to the needed time of the reference route.

* * * * *